(12) United States Patent
Bechtolsheim et al.

(10) Patent No.: US 7,043,541 B1
(45) Date of Patent: May 9, 2006

(54) METHOD AND SYSTEM FOR PROVIDING OPERATIONS, ADMINISTRATION, AND MAINTENANCE CAPABILITIES IN PACKET OVER OPTICS NETWORKS

(75) Inventors: Andreas Bechtolsheim, Stanford, CA (US); Hiroshi Suzuki, Palo Alto, CA (US); Marinica Rusu, Sunnyvale, CA (US); Paul Frantz, Palo Alto, CA (US); Sharat Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 836 days.

(21) Appl. No.: 09/668,253

(22) Filed: Sep. 21, 2000

(51) Int. Cl.
*G06F 15/173* (2006.01)
*G06F 15/16* (2006.01)

(52) U.S. Cl. .................................. 709/223; 709/236

(58) Field of Classification Search ............... 709/236, 709/223, 246, 249; 370/445, 522, 523, 528, 370/464, 465, 236.2
See application file for complete search history.

(56) References Cited

U.S. PATENT DOCUMENTS

| | | | | |
|---|---|---|---|---|
| 4,878,219 A | * | 10/1989 | Kaufman et al. | 370/452 |
| 5,550,803 A | * | 8/1996 | Crayford et al. | 370/246 |
| 5,559,796 A | * | 9/1996 | Edem et al. | 370/412 |
| 5,872,920 A | * | 2/1999 | Hausman et al. | 709/250 |
| 6,112,247 A | * | 8/2000 | Williams | 709/236 |
| 6,292,517 B1 | * | 9/2001 | Jeffress et al. | 375/287 |
| 6,498,667 B1 | * | 12/2002 | Masucci et al. | 398/98 |
| 2004/0156390 A1 | * | 8/2004 | Prasad et al. | 370/466 |

OTHER PUBLICATIONS

Gail Huang, "Generic Format for Carrying Ethernet MAC Frames over SONET", Oct. 8, 1999, T1X1.5/99-268r1.*
Alan J Weissberger, Stephen Gorshe, Alan Repech, and Basant Khaitan, "T1.105.02 draft text for Mapping IEEE 802.3/Ethernet MAC frames to SONET payloads", Jul. 29, 1999, T1X1.5/99-204.*
Tim Armstrong, "Concerns with HDLC Encapsulation for Ethernet MAC mapping into SONET/SDH", Oct. 8, 1999, T1X1.5/99-267.*
Ken Murakami, "Frame Switching Technical White Paper", Mar. 1998, pp. 8-14 ("SONET Eveywhere").*
"Hiroshi Suzuki: Taking Ethernet Beyond the LAN", Cisco Systems, http://newsroom.cisco.com/dlls/innovators/optical/hiroshi_suzuki_profile.html.*

(Continued)

*Primary Examiner*—Glenton B. Burgess
*Assistant Examiner*—Aaron Strange
(74) *Attorney, Agent, or Firm*—Cindy Kaplan

(57) ABSTRACT

A method for conveying management information across a network. The method includes receiving an Ethernet packet at a network element and modifying the packet by inserting a header in place of some or all of an unused portion of a preamble within the packet. The header is configured to provide support for network management. The method further includes transmitting the modified packet from the network element. The method may also include examining and updating the header at intermediate network elements and examining and replacing the header with the preamble at an egress network element.

58 Claims, 15 Drawing Sheets

OTHER PUBLICATIONS

"Q&A: Hiroshi Suzuki on Extending Ethernet Beyond the LAN", Cisco Systems, http://newsroom.cisco.com/dlls/innovators/optical/hiroshi_suzuki_qa.html.*

Hiroshi Suzuki and Bruce Tolley, "Why OAM for Ethernet", Mar. 2001, IEEE802.3 EFM SG Presentation.*

Hiroshi Suzuki, Hugh Barrass, Jian Song, Howard Baumer, David Sorensen, Martin Nuss, david Law, Bob Barrett, Fred Mohamadi, and Rich Taborek, "EFM OAM on Preamble", Nov. 2001, IEEE802.3ah EFM Task Force Presentation.*

Hiroshi Suzuki, Sanjeev Mahalawat, Rich Taborek, and Ben Brown, "Ethernet Preamble Transparency for OAM capability", Jan. 2002, IEEE802.3ah EFM Task Force Presentation.*

Hiroshi Suzuki, Sanjeev Mahalawat, Rich Taborek, and Ben Brown, Martin Nuss, Jian Song, and Bob Barrett, "EFM OAM on Preablme", Jan. 2002, IEEE802.3ah EFM Task Force Presentation.*

"HDLC—High Level Data Control", 1994, http://www2.rad.com/networks/1994/hdlc/hdlc.htm.*

Ziegler Alon and Kirshenberg Gilad, "HDLC—High Level Data Link Control", Jan. 20, 1998, Web page, Archived by Internet Archive Wayback Machine, Available at: http://web.archive.org/web/19980120050038/http://www.rad.com/networks/1994/hdlc/hdlc.htm.*

L. Mamkos, K. Lidl, J. Evarts, D.Carrel, D. Simone, and R. Wheeler, "A Method for Transmitting PPP Over Ethernet (PPPoE)", Feb. 1999, RFC 2516.*

Rich Seifert, "About 1000Base-X Ethernet technology", Web Page, Retreived on Feb. 8, 2004 from http://groups-beta.google.com/group/comp.dcom.lans.ethernet/msg/d0a061501f7026cf?dmode=print.*

Tsiang, Suwala, "The Cisco SRP MAC Layer Protocol", May 1, 2000.

* cited by examiner

PACKET OVER SONET

ETHERNET OVER SONET

METHOD AND SYSTEM FOR PROVIDING OPERATIONS, ADMINISTRATION, AND MAINTENANCE CAPABILITIES IN PACKET OVER OPTICS NETWORKS

BACKGROUND OF THE INVENTION

The present invention relates generally to digital communication networks, and more specifically, to packet over optics networks.

In the early days of fiber optics, every telephone company had its own proprietary optical Time Division Multiplexing (TDM) protocol. In 1985 the telecommunications industry began working on a standard called SONET. This work resulted in a SONET standard in 1989. The advent of technologies such as Asynchronous Transfer Mode (ATM) over SONET and direct mapping of IP over SONET frames has extended the useful life of this technology. Packet over SONET has recently been used to support the deployment of IP-based video and voice applications. Packet over SONET places the IP layer directly above the SONET layer and eliminates the overhead needed to run IP over ATM over SONET (FIG. 1A). FIG. 1B illustrates conventional Ethernet over SONET. Virtually all the long distance telephone traffic in the United States and elsewhere now uses trunks running SONET in the physical layer.

SONET and SDH are a set of related standards for synchronous data transmission over fiber optic networks. SONET is short for Synchronous Optical Network and SDH is an acronym for Synchronous Digital Hierarchy. SONET is the United States version of the standard published by the American National Standards Institute (ANSI). SDH is the international version of the standard published by the International Telecommunications Union (ITU).

SONET/SDH is currently used in wide area networks (WAN) and metropolitan area networks (MAN). A SONET system consists of switches, multiplexers, and repeaters, all connected by fiber. The connection between a source and destination is called a path. The basic SONET frame is a block of 810 bytes transmitted every 125 μsec. Since SONET is synchronous, frames are emitted whether or not there is any useful data to send. The first three columns of each frame are reserved for system management information. The first three rows contain section overhead and the next six contain line overhead. A section is a fiber going directly from any device to any other device, with nothing in between. A line is run between two multiplexers. The section overhead is generated and checked at the start and end of each section, whereas the line overhead is generated and checked at the start and end of each line. The first column of user data (called the synchronous payload envelope (SPE)) is the path overhead (i.e., header for the end-to-end path sublayer protocol). The section, line, and path overheads contain a profusion of bytes used for operations, administration, maintenance, and provisioning (OAM&P). Since each byte occurs 8000 times per second, it represents a PCM (pulse code modulation) channel. Three of these are used to provide voice channels for section, line, and path maintenance personnel. Other bytes are used for framing, parity, error monitoring, IDs, clocking, synchronization, and other functions.

SONET/SDH and optical fiber have emerged as significant technologies for building large scale, high speed, Internet Protocol (IP) based networks. However, it is desired to eliminate the intervening SONET/SDH layer in future packet over optics networks for cost efficiency, ease of management, and bandwidth efficiency.

One standard that describes the interconnection of computer devices in local area network (LAN) communication is IEEE (Institute of Electrical and Electronic Engineers) standard 802.3, commonly referred to as Ethernet (also adopted as International Standard ISO/IEC 8802-3). The Ethernet system includes an Ethernet frame that consists of a standardized set of bits used to carry data over the system. The fields of an Ethernet packet (also referred to as an Ethernet frame) include address fields, a variable size data field that carries from 46 to 1500 bytes of data, and an error checking field that checks the integrity of bits in the frame to make sure that the frame has arrived intact. The Ethernet frame encapsulates payload data by adding a 14 byte header before the data and appending a 4-byte (32-bit) cyclic redundancy check (CRC) after the data. The entire frame is preceded by a small idle period (the minimum inter-frame gap, 9.6 microseconds) and an 8 byte preamble.

In the case of 10 Mbps and 100 Mbps Ethernet, the preamble is typically used to allow time for the receiver in each node to achieve lock of the receiver Digital Phase Lock Loop which is used to synchronize the receive data clock to the transmit data clock. At the point when the first bit of the preamble is received, each receiver may be in an arbitrary state (i.e., have an arbitrary phase for its lock clock). During the course of the preamble it learns the correct phase, but in doing so, it may miss (or gain) a number of bits. A special pattern, known as the start of frame delimiter, is used in conventional systems to mark the last two bits of the preamble. When this is received, the Ethernet receive interface starts collecting bits for processing by the MAC (medium access control) layer.

For 1 Gbps Ethernet (IEEE 802.3a), 8b/10b transmission code is used. Synchronization and code group alignment makes use of the comma control character. The preamble (including the start of frame field) has a length of eight bytes and has been retained only for backward compatibility. The preamble (excluding the start of frame field) is thus, for the most part, extra overhead which is not fully utilized.

Ethernet is typically not used in WAN applications since it does not provide operations, administration, maintenance, and provisioning capabilities. It would be desirable to modify the standard Ethernet packet to provide OAM&P capabilities and eliminate the need for the SONET/SDH layer in packet over optics networks.

SUMMARY OF THE INVENTION

Methods and systems for providing operations, administration, and maintenance capabilities in packet over optics networks are disclosed.

A method for conveying network management information across a network generally comprises receiving an Ethernet packet at a network element and modifying the Ethernet packet by inserting a header in place of a preamble within the packet. The header provides support for network management. The method further includes transmitting the modified packet from the network element.

The method may further include reading and modifying the management information at transit nodes and replacing the header with a standard preamble at an egress node. The network management may include operations, administration, maintenance, and provisioning (OAM&P), for example, The header preferably includes the same number or a fewer number of bytes than the preamble of the Ethernet packet so that a size of the packet is not increased when the preamble is replaced by the header. The header is preferably inserted at an edge of the managed network. The header is removed and replaced with the preamble at an egress boundary of the managed network. The header may include a subinterface identifier that identifies the originating port of the packet so that packet streams can be multiplexed at one node within the network and demultiplexed at another node within the network. Idle packets may be inserted into the packet stream at locations where no data is received by the network element so that the OAM&P information in the headers may be carried across the network even in the absence of user data frames.

A system for supporting network management includes a network element generally comprising a port controller operable to receive a packet and modify the packet by inserting a header in place of a preamble within the packet. The header is configured to provide support for network management. The network element further comprises a network element controller coupled to the port controller and operable to generate and consume network management information.

The port controller may include an optical to electrical converter, a CDL handler, and a crossconnect. The handler may be dedicated hardware, microcode, software, or photonic (optical) logic, for example.

The system may further include a second network element positioned at an egress boundary of the network and operable to replace the header with the preamble. A plurality of transit network elements may be positioned within the network to connect the ingress network element with the egress network element. The transit element is configured to receive the modified packet, modify the header, and forward the packet.

In another aspect of the invention, a system generally comprises a handler operable to remove a preamble from an Ethernet packet and insert a header. The header may include an operations, administration, and maintenance field, a message channel, an application specific field, and a header error detection field.

In yet another aspect of the invention, a computer program product for supporting network management generally comprises code that receives an Ethernet packet and code that modifies the Ethernet packet by inserting a header in place of a preamble within the packet. The header provides support for network management. The product further includes code that transmits the modified packet from a network element and a computer-readable storage medium for storing the codes.

A system of the present invention generally comprises a processor that executes a program for modifying an Ethernet packet to provide OAM capabilities. The program includes code that receives an Ethernet packet, code that modifies the Ethernet packet by inserting a header in place of a preamble within the packet, code that transmits the modified packet over a path within the network, and a computer-readable storage medium having the program stored thereon.

In another aspect of the invention, a system generally comprises a processor operable to remove a preamble from an Ethernet packet and insert a header into the packet. The header includes an operations, administration, and maintenance field, a message channel, an application specific field, and a header error protection field.

In yet another aspect of the invention, a system for supporting network management generally comprises a processor operable to wrap a digital wrapper around a data link layer. The digital wrapper comprises an operations, administration, and maintenance field, a message channel, an application specific field, and an error protection field covering the digital wrapper.

A system for conveying network management information across a network generally comprises means for receiving a packet at a network element, means for modifying a preamble of the packet to support network management, and means for transmitting the modified packet.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 2:
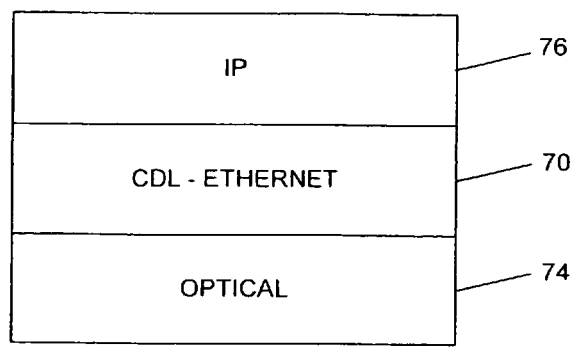
FIG. 2 is a diagram illustrating the relationship between a converged data link layer of the present invention and an IP and optical layer.

FIG. 2 illustrates network layers in a system of the present invention used to transport data over optical networks. The system includes a converged data link (CDL) which replaces the SONET layer in conventional systems. CDL may be applied, for example, to any physical link layer that is capable of full-duplex transmission of Ethernet packets. CDL layer 70 operates between IP layer 76 and a physical layer of the optical network 74. It is to be understood that other lower and higher layers may be used without departing from the scope of the invention.

Figure 1A:
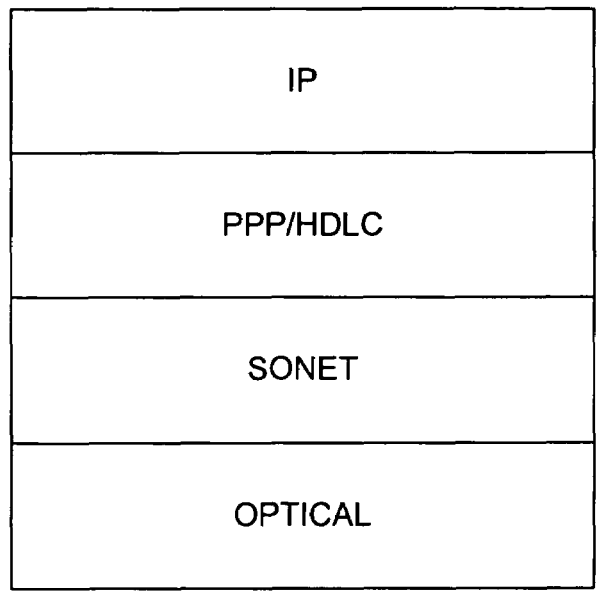
FIG. 1A is a diagram illustrating layers of a prior art packet over optics network utilizing SONET.
Figure 1B:
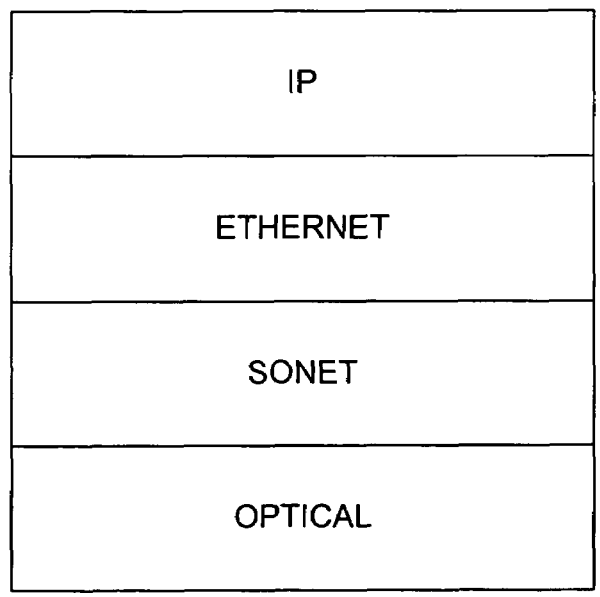
FIG. 1B is a diagram illustrating layers of a prior art Ethernet over SONET system.

CDL enables configuration, performance, and fault management of the network without the intervening SONET/SDH layer (see FIG. 1), thus reducing system costs and increasing management and bandwidth efficiencies. CDL further provides operations, administration, maintenance and provisioning (OAM&P) (or OAM, or any single feature or combination thereof), multiplexing, and multiple qualities of service in packet over optics networks. For example, CDL may support general management of optical networks, supervision of unused channels, provisioning of optical paths, performance monitoring of optical paths, and failure recovery. CDL also enables multiplexing of multiple logical lower speed circuits across a single optical channel including support for a multi-access form of statistical multiplexing appropriate to ring topologies. It is to be understood that CDL may provide all of the above mentioned functions, only one of these functions, or any combination of these functions, without departing from the scope of the invention.

The method and system of the present invention are used to modify the Ethernet protocol to add additional functions. As described below, a standard Ethernet packet is modified to add CDL information upon transmission, and a received CDL packet is converted to a standard Ethernet packet by stripping the CDL information upon reception. The invention may also be implemented without having the packet pass through a device in a standard Ethernet format. An example is a computer with a single network interface that transmits and receives CDL formatted frames on that interface.

The present invention operates in the context of a data communication network including multiple network elements. A network element may be, for example, a terminal multiplexer, an add-drop multiplexer (ADM), an optical crossconnect (OXC), or a signal regenerator. Two terminal multiplexers may be linked by fiber optics with or without a regenerator to form an optical path. A regenerator may be needed when, due to a long distance between multiplexers, the signal level in the fiber becomes too low. The regenerator recovers timing from the received signal. An ADM may be deployed at a terminal site or any intermediate location for consolidating traffic from widely separated locations. Several ADMs may also be configured as a survivable ring. At the site of an ADM, only those signals that need to be accessed are dropped or inserted. The remaining traffic continues through the network element without requiring special pass through units or other signal processing. The crossconnect may be used to establish association between ingress and egress links, as described below. Optionally a crossconnect may demultiplex or multiplex a signal that is a group of signals into or from its constituent signals and perform cross connection at the granularity of its constituent signals.

Figure 3A:
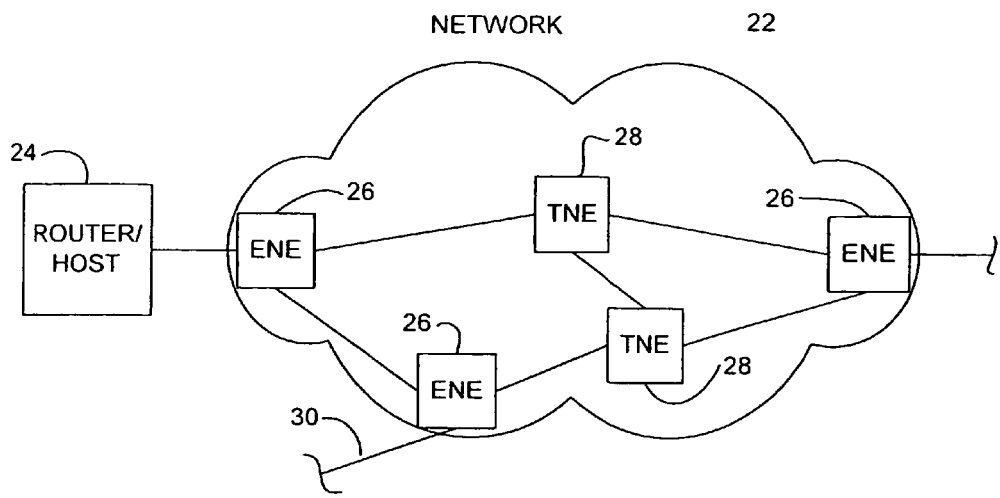
FIG. 3A is a diagram illustrating edge and transit network elements within a network.

CDL is used in the transmission of packets along an optical path (OP) across networks that are composed of network elements. FIG. 3A illustrates an exemplary network comprising a plurality of network elements 26, 28. An optical path may pass through any number of intermediate network elements. The end point of a CDL optical path may be a router or other network element if it is acting as a gateway to a section of the network which does not support CDL. For example, network 22 is connected to a router or host 24. The router or host 24 sends packets into the network 22 to a network element 26 located on an edge of the network. The network 22 shown in FIG. 3A includes three edge network elements 26 which are interconnected with transit network elements 28 through network/node interfaces. The edge network elements 26 may also receive transmissions from a user/network interface 30. The edge network elements 26 which are positioned to receive transmissions coming into the network (i.e., two edge network elements (ENE) on left side of network as viewed in FIG. 3A), are referred to as ingress edge network elements. The edge network element positioned to transmit packets from the network 22 (i.e., right most ENE in FIG. 3A) is referred to as an egress edge network element. As further described below, the ingress edge network elements 26 are configured to replace a preamble in the incoming packet with the CDL header, the transit network elements 28 are configured to modify the CDL header and forward the packet, and the egress edge network elements are configured to replace the CDL header in the incoming packet with the preamble.

While this invention is described with ingress transit and egress network interfaces, these functions may also be combined into a single implementation. For example, data flows through an edge network element may bi-directional, in which case the same network element acts as an ingress network element for frames heading into the network, and as an egress element for frames leaving the network.

Figure 3D:
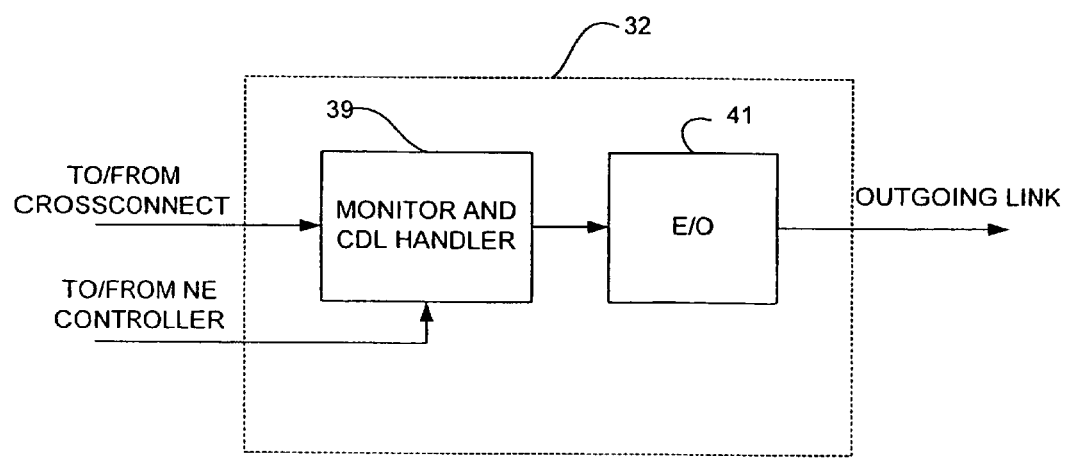
FIG. 3D is a diagram illustrating an egress port controller of the network element of FIG. 3B.
Figure 3B:
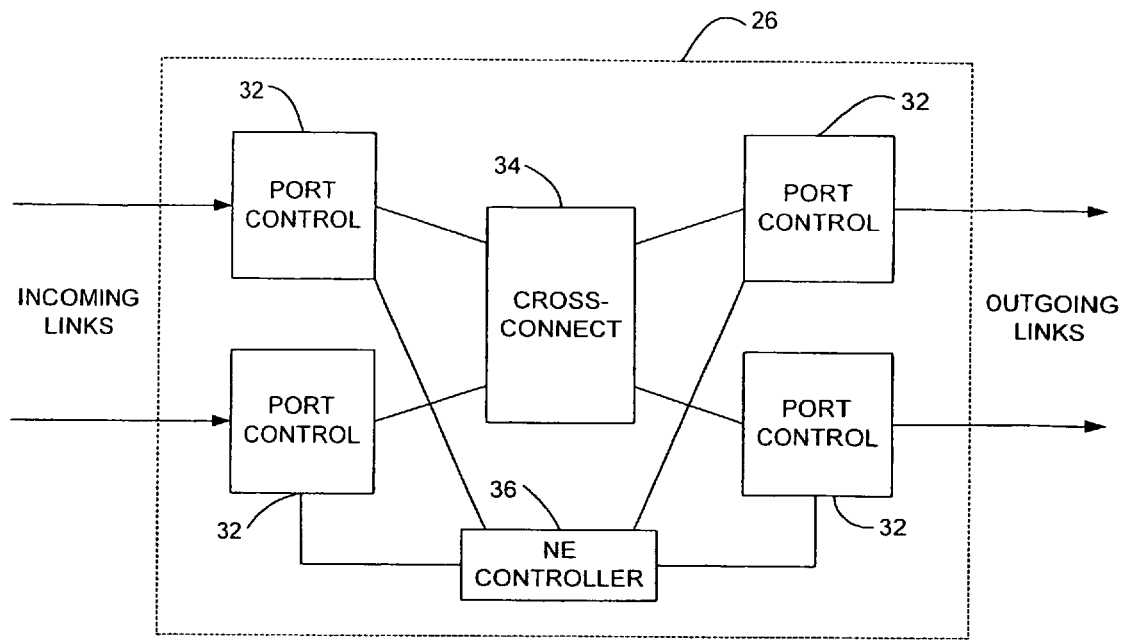
FIG. 3B is a diagram of one of the network elements of FIG. 3A showing additional detail.
Figure 3C:
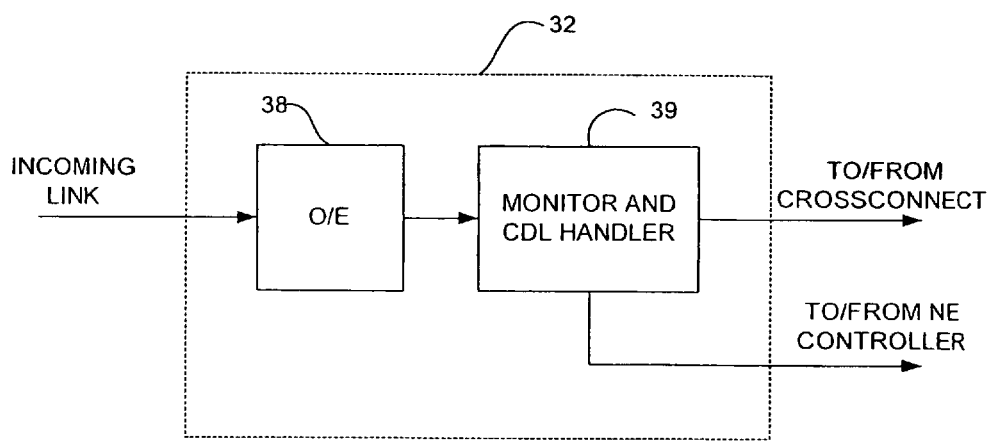
FIG. 3C is a diagram illustrating an ingress port controller of the network element of FIG. 3B.

The invention described herein may be implemented in dedicated hardware, microcode, software, or photonic (optical) logic. FIGS. 3B and 3C illustrate an implementation in dedicated hardware. FIG. 3B is a diagram of one of the edge network elements 26 of FIG. 3A. The network element 26 includes a plurality of port controllers 32, crossconnect 34, and network element controller 36. The port controllers 32 provide an interface between network links and crossconnect 34. The crossconnect 34 receives packet streams from the port controllers 32 coupled to the incoming links and selects one of the port controllers coupled to the outgoing links to transmit the packet stream. The network element controller 36 generates or utilizes management information received by the packet and exercises overall control of the network element. The network element controller 36 may also receive from or transmit to the port controllers 32 some or all of the network management information conveyed by the CDL header.

FIG. 3C illustrates a port controller 32 of an ingress port of an edge network element 26. The port controller 32 includes an optical to electrical (O/E) converter 38 and a monitor and CDL handler 39. The CDL handler 39 of the port controller 32 connected to one of the ingress links is used to replace the preamble with the CDL header. The port controller 32 of a transit network element 28 or transit port of an edge network element 26 includes a CDL handler that is configured to modify the CDL header of incoming packets with network management information and forward the packet to a neighboring transit network element to egress network element 26. The port controller 32 of an egress network element 26 is shown in FIG. 3D and includes an electrical to optical converter 41 which is positioned downstream of the CDL handler 39. The CDL handler 39 for the egress network element 26 is configured to replace the CDL header of the incoming packets with the preamble.

Figure 4:
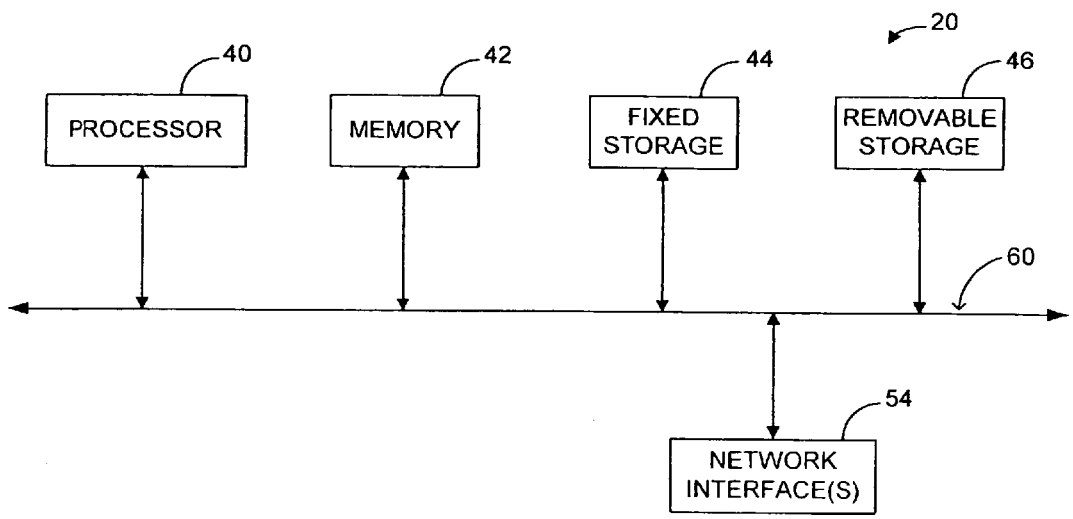
FIG. 4 is a system block diagram of a computer system that can be utilized to execute software of an embodiment of the present invention.

FIG. 4 shows a system block diagram of computer system 20 that may be used as a router or host or used to execute software of an embodiment of the invention. The computer system 20 includes memory 42 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 20 further includes subsystems such as a central processor 40, fixed storage 44 (e.g., hard drive), removable storage 46 (e.g., CD-ROM drive), and one or more network interfaces 54. Other computer systems suitable for use with the invention may include additional or fewer subsystems. For example, computer system 20 may include more than one processor 40 (i.e., a multi-processor system) or a cache memory. The computer system 20 may also include a display, keyboard, and mouse (not shown) for use as a host.

The system bus architecture of computer system 20 is represented by arrows 60 in FIG. 4. However, these arrows are only illustrative of one possible interconnection scheme serving to link the subsystems. For example, a local bus may be utilized to connect the central processor 40 to the system memory 42. Computer system 20 shown in FIG. 4 is only one example of a computer system suitable for use with the invention. Other computer architectures having different configurations of subsystems may also be utilized. Communication between computers within the network is made possible with the use of communication protocols, which govern how computers exchange information over a network.

In the following description, the term end-to-end refers to OAM&P information that pertains to a specific optical path in its entirety. Preferably, only the source or destination end-point network elements act upon this information, however, intermediate network elements may generate this information. The term hop-by-hop refers to OAM&P information that pertains to the portion of the optical path between two adjacent network elements. Preferably, only adjacent network elements act upon this information. CDL information is provided on a per packet basis and applies to a specific optical path. When a fiber is used to carry multiple wavelengths, one of the wavelengths may be selected to carry information that applies collectively to all optical paths. This is implemented at a management layer above CDL and is transparent to CDL.

The following describes a packet based optical network that uses Ethernet data link layer at speeds, for example, of 10 Gbps and above, both over high speed point-to-point circuits (i.e., dark fiber) and over wavelength division multiplexing (WDM), where multiple optical channels share one fiber. However, it is to be understood that the system may be used with media types and different than those described herein, without departing from the scope of the invention.

As discussed above, CDL is a wrapper around the link layer packet. The CDL wrapper comprises a self-contained 8 byte CDL header that is prepended to standard Ethernet packets (e.g., IEEE 802.3) by replacing a preamble of the Ethernet packet. Since the Ethernet preamble is also 8 bytes in length, the overall size of a CDL modified Ethernet packet is the same as a standard Ethernet packet. Thus, CDL headers can be inserted into standard Ethernet packets without any change in bandwidth. As further described below, the Ethernet preamble is replaced with the CDL header at a network edge as packets enter the network, and the CDL header is removed and replaced with the Ethernet preamble at an egress boundary of the network. It is to understand that although the invention is described herein using an Ethernet packet, other types of packets having a preamble may also be used. Thus, the term "Ethernet packet" as used herein includes packets formatted according to standards other than IEEE 802.3.

Figure 5:
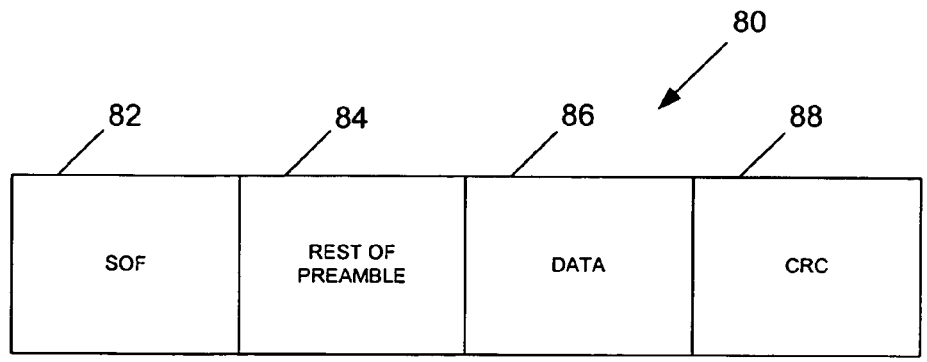
FIG. 5 is a diagram illustrating a standard Ethernet packet.

FIG. 5 illustrates a summarized version of a standard Ethernet packet 80 before the preamble is replaced with the CDL header. The packet 80 includes a start of frame field 82, preamble 84, data field 86, and CRC (cyclic redundancy check) 88. Standard IEEE 802.3/Ethernet packets typically include the following fields after the preamble: destination address (6 bytes), source address (6 bytes), length or type field (2 bytes), data field (46–1500 bytes), and frame check sequences (4 bytes). These fields are summarized as the data field 86 in FIG. 5 for simplification. The destination Ethernet address is the address of the intended receiver. The source Ethernet address is the unique Ethernet address of the sending system. The length or type field is the number of bytes of data or the higher layer protocol identifier. The CDL packet may be variable in size and CDL implementations preferably provide for Ethernet packets from a minimum of 64 bytes to a maximum of 9800 bytes. Short packets are padded to 64 bytes (for IEEE 802.3 frame formats). A 32-bit CRC (cyclic redundancy check) is added at the end of the frame to provide error detection in the case where line errors result in corruption of the frame. Any frame with an invalid CRC is discarded by the receiver without further processing. The above described fields all remain in the Ethernet packet when the CDL header is added to the packet. Only the preamble field 84 is removed.

Figure 6:
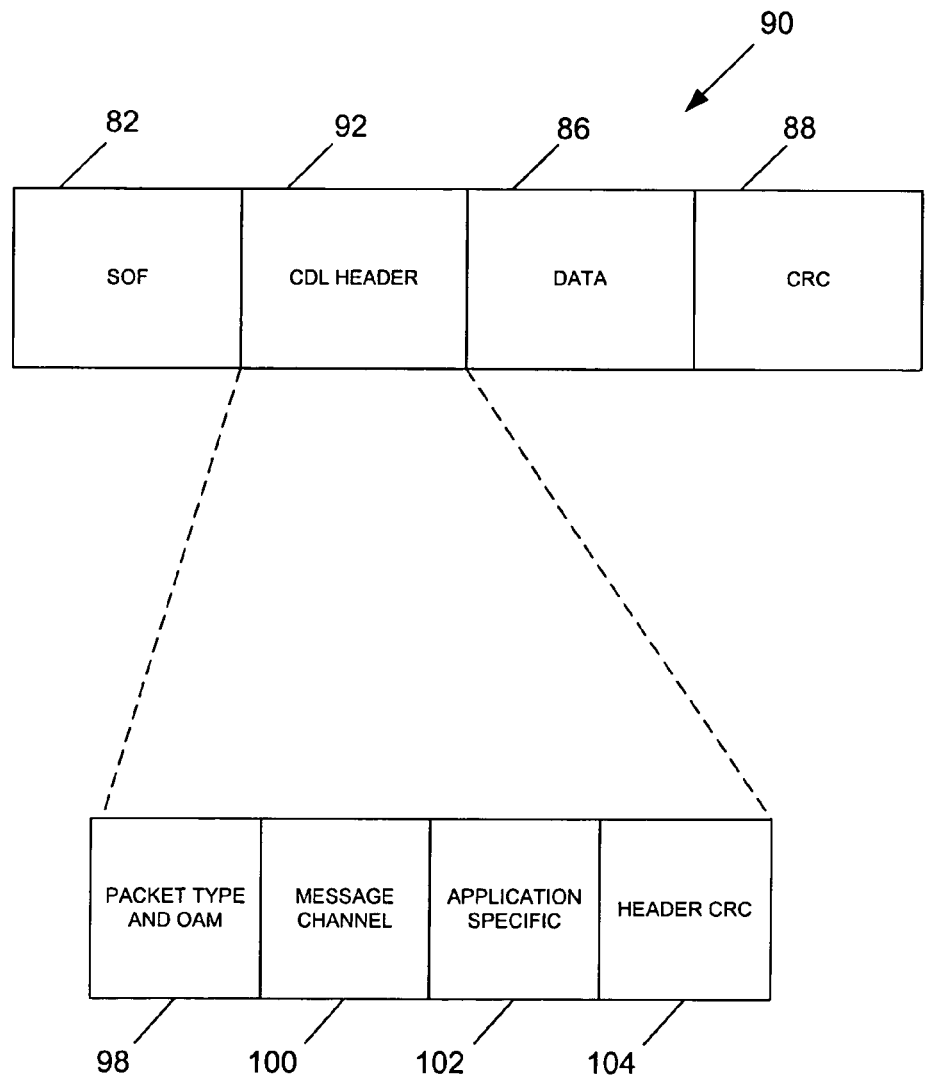
FIG. 6 is a diagram of the Ethernet packet of FIG. 6 modified to include a converged data link header of the present invention.

FIG. 6 illustrates the modified Ethernet packet 90 with CDL header 92 inserted in place of the preamble 84. The value for the start of frame (or start of packet) field 82 is preferably the same as the value for a standard IEEE 802.3 physical layer. On transmission layers that do not carry SOF delimiters, the value of SOF is preferably 0x0 and there is a distinct delineation header. The following fields are preferably included in the CDL header 92 (FIG. 6):

Byte [1]: Packet type and OAM information 98

Byte [2]: Message channel 100

Byte [3–6]: Application specific information 102

Byte [7]: Header cyclic redundancy check (CRC) 104

The following describes the contents and function of each of the fields in the order listed.

The OAM field 98 carries packet type information, error flags, and an automatic protection switching (APS) subchannel. Automatic protection switching provides the capability of a transmission system to detect a failure on a working facility and to switch to a standby facility to recover the traffic, thus, improving overall system availability. The type field identifies whether or not the data and CRC fields 86, 88 are present.

OAM Packet Type Field [7:6]:
   00: Standard IEEE 802.3/Ethernet packet with CDL header in place of preamble
   01: Standard IEEE 802.3/Ethernet packet (with standard preamble)
   10: Idle packet with CDL header
   11: Reserved The above is a preferred encoding of the Type field. It is to be understood that other encodings may be used. The Type field position and encoding is preferably such that a standard Ethernet frame can be identified.

OAM [5]: APS framing BIT
   0: OAM [4] is a bit in the body of current APS frame
   1: OAM [4] is an idle bit between APS frames
OAM [4]: APS Subchannel. May be a bit of the 16 bit APS frame or an idle bit between two consecutive APS frames.
OAM [3]: End-to-end backward defect indication (BDI-E)
OAM [2]: End-to-end forward defect indication (FDI-E)
OAM [1]: Hop-by-hop backward defect indication (BDI-H)
OAM [0]: Hop-by-hop forward defect indication (FDI-H)

The 16 bit APS frame is constructed out of the OAM [4] bit from 16 consecutive packets. OAM [5] bit is preferably clear in these packets and set in the packet preceding the first packet and in the packet following the 16$^{th}$ packet. OAM [5] bit may be set in more than one packet preceding the first of 16 packets and in more than one packet following the 16 packets. The set of fields, code values, and their semantics may be the same as k1 and k2 bytes used in SONET/SDH (ITUTG841) to support line multiplex section level automatic protection switching:

APS [15:13]: Reserved
APS [12]: APS architecture
APS [11:8]: APS request/status
APS [7:4]: APS request channel
APS [3:0]: APS bridged channel.

The message channel 100 provides a communication mechanism between the network elements. Messages are preferably transmitted in packets using HDLC (high level data link control) framing and are transferred 8 bits at a time. Means for layering higher layer protocols such as IP over an HDLC channel are well known by those skilled in the art. Messages are hop-by-hop and may be forwarded or routed according to established routing protocols. The message channel 100 allows management communication over the same physical facilities as the user data but without taking any bandwidth from the user data.

The optical management messages support, in addition to fault indication and protection switching signaling, connectivity verification, performance monitoring, and processor-to-processor messages. Connectivity verification and performance monitoring are preferably performed periodically and handled by hardware or a dedicated microcontroller. Through connectivity verification, a receiver can periodically ascertain that all the intermediate network elements, as a combined result of initial provisioning and subsequent protection switches, are correctly configured so that the optical path terminating in the receiver originates at the correct network element. Performance monitoring allows intermediate network elements along an optical path to periodically communicate to the destination network element various metrics of the quality of the optical path to the destination network element and to the source network element. The processor-to-processor messages include routing and signaling protocol messages for automatic establishment of optical paths and management messages which allow the network to be managed.

CDL may provide numerous alarms and error messages that are sent via the message channel 100 in the CDL header. Alarms, which are also known as defects or faults, are associated with complete failures. Errors (also referred to as anomalies) pertain to incomplete failures such as parity errors. Network elements may detect events at various layers (e.g., section, line, and path) and notify other devices of pending adverse network conditions. CDL management facilities enable easy troubleshooting, failure detection, fault isolation, centralized maintenance, and remote provisioning.

Figure 7:
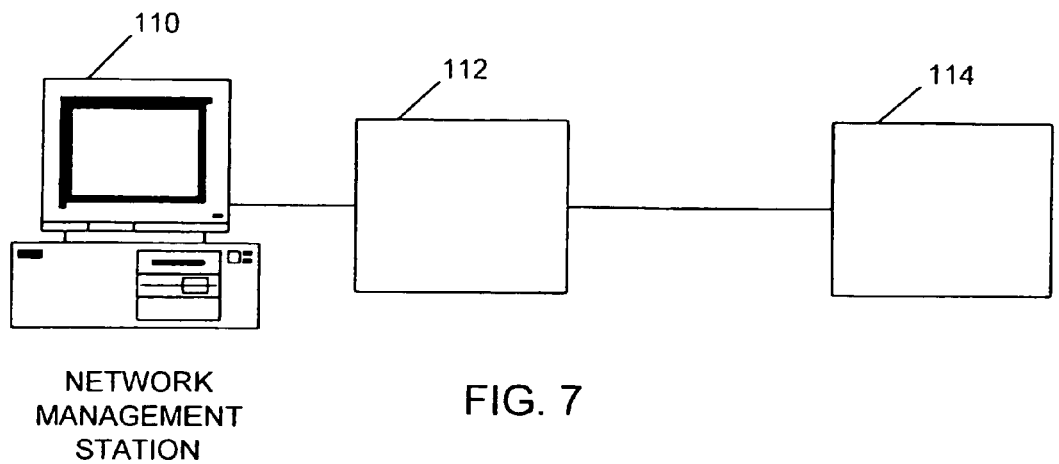
FIG. 7 is a schematic illustrating two network elements connected to a network management station.

The side-band message channel 100 provides a mechanism for supporting single ended management, as shown in FIG. 7. One node of the network is a network management station 110 used to monitor and control overall network operation. The network management station 110 is connected to a first network element 112 which is connected through a converged data link to a second network element 114. The network management station 110 can configure, manage, and troubleshoot both network elements 112, 114 without requiring a direct link between the network management station 110 and the second network element 114. Conventional management systems often utilize in-band management communication that mixes management traffic in with user data on the link between the network elements, which may lead to security problems. Furthermore, in-band management communication is susceptible to congestion crowding out the management traffic.

Figure 8:
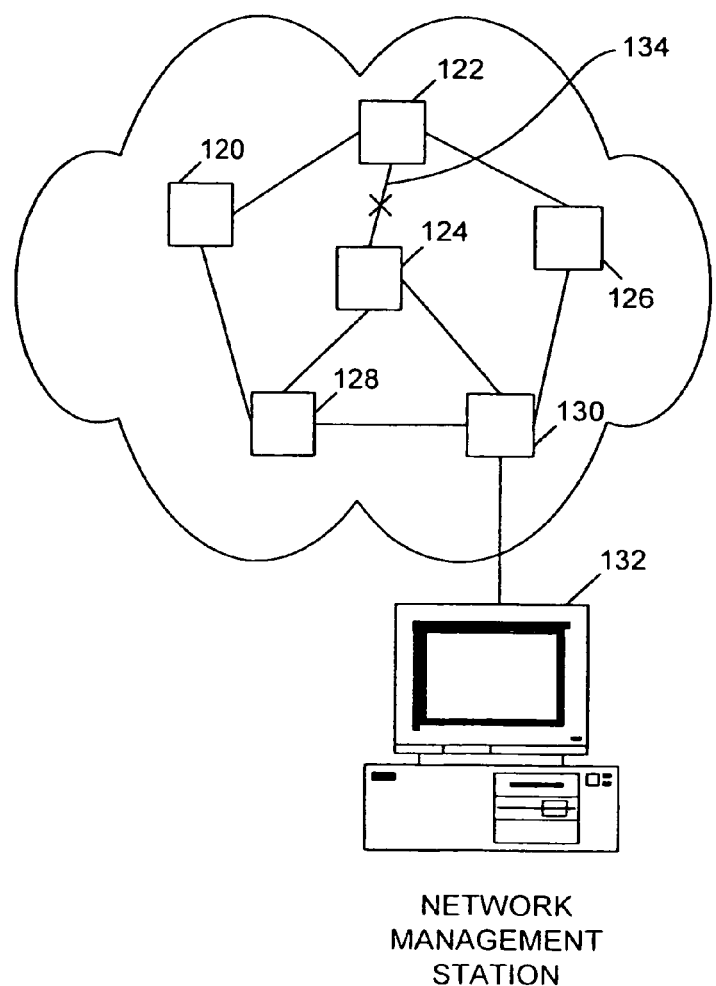
FIG. 8 is a schematic illustrating a plurality of network elements connected to a network management station.

FIG. 8 illustrates a plurality of network elements 120, 122, 124, 126, 128, 130 and a network management station 132 connected to network element 130. The CDL message channel 100 allows network elements 122 and 124 to send alarm messages indicating that link 134 between the network elements has failed to the network management station 132. The message channel 100 provides a secure means of forwarding the message which is not affected by congestion of user traffic.

As long as network elements that transmit, modify, and terminate CDL along an optical path are secure, the operation of CDL is secure. In order for security to be maintained, any network element that connects to an untrusted port terminates the CDL optical path.

Figure 9A:
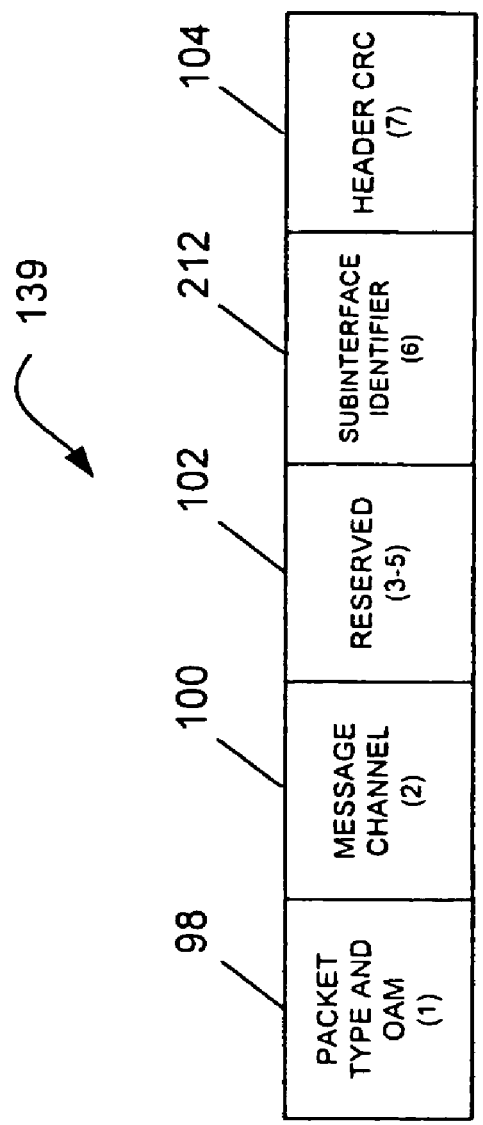
FIG. 9A is a diagram illustrating a CDL header configured to support multiplexing of packet streams.
Figure 9B:
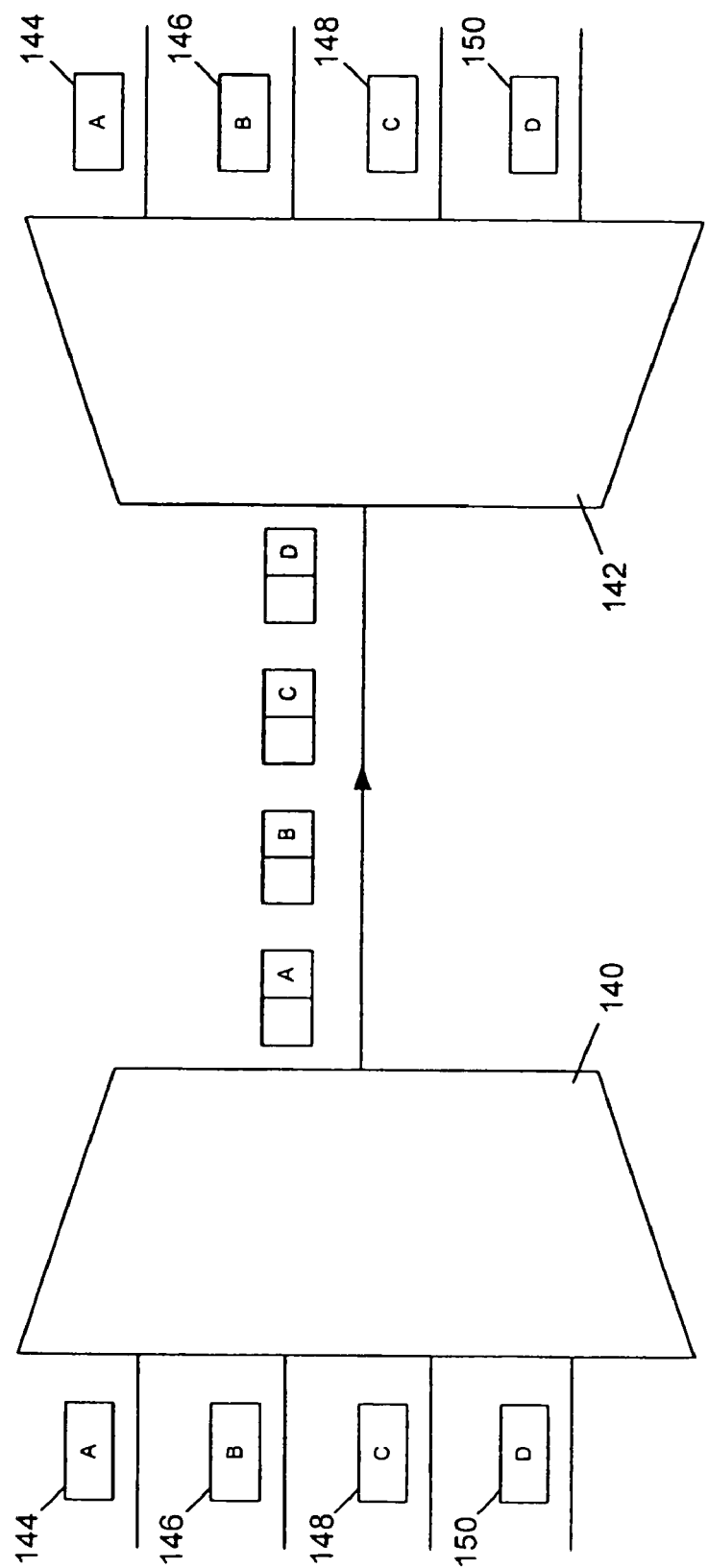
FIG. 9B is a schematic illustrating multiplexing of packets using the CDL header of FIG. 9A.

The application specific (AS) field 102 carries information between end nodes that is forwarded along an optical path. Preferably, the information is not modified by an intermediate network element along the optical path. The application specific field 102 may include a subinterface identifier to assist in multiplexing packet streams as shown in FIGS. 9A and 9B, for example. FIG. 9A shows a CDL header 139 configured to support multiplexing of packet streams. The header includes a subinterface identifier 212. The bytes are preferably transmitted in ascending order. If a field is multiple bytes long, the most significant bits are transmitted first. At the transmitting node 140, multiple lower rate packet streams are multiplexed into an aggregate packet stream (FIG. 9B). To facilitate demultiplexing at the receiving end 142, the least significant application specific byte carries an 8-bit subinterface identifier. The identifier allows traffic from multiple ports to be combined and remain distinct from one another by labeling the ports to keep the traffic separate. The identifier is used to demulitplex the packet streams when they reach their destination or receiving node 142. As shown in FIG. 9B, individual packets 144, 146, 148, 150 are labeled A, B, C, D so that packets from different ports can be sent together on a common trunk. The label identifies the port on which the packet originated (e.g., packet 144 is on port A, packet 146 is on port B, packet 148 is on port C, and packet 150 is on port D). The subinterface identifier is included in the header added to the packet at network element 140. Network element 142 removes the CDL header and sends each packet to its corresponding destination port (A-D). Since the identifier field is inserted into the field previously occupied by the preamble, it does not interfere with wire speed performance or affect integrity of the payload.

The application specific field 102 may also be used to support applications other than multiplexing. For example, the application specific field 102 may be used to facilitate multi-protocol label switched routing.

The header CRC 104 is employed for header error protection and covers the CDL header but not any other parts of the frame. The CRC is preferably computed over the entire value of the CDL header, including the AS field 102, but excluding the value of the SOF field 82. The CRC may be based on CRC-8 [ITU-T G.432.1]. For example, the CRC header may be an 8-bit sequence that is the remainder of the modulo-2 division by the generator polynomial $x^8+x^2+x+1$ of the product $x^8$ multiplied by the content of the CDL header excluding the header CRC. The 48-bit long relevant portion of the CDL header is taken to represent a polynomial of order 47. The coefficients can have the value 0 or 1. The first bit of the header represents the coefficient of the highest order ($x^47$) term. The polynomial operations are performed modulo-2. The CRC header is preferably recomputed whenever any of the fields in the header are changed and passed transparently whenever the fields of the header do not change.

Figure 10:
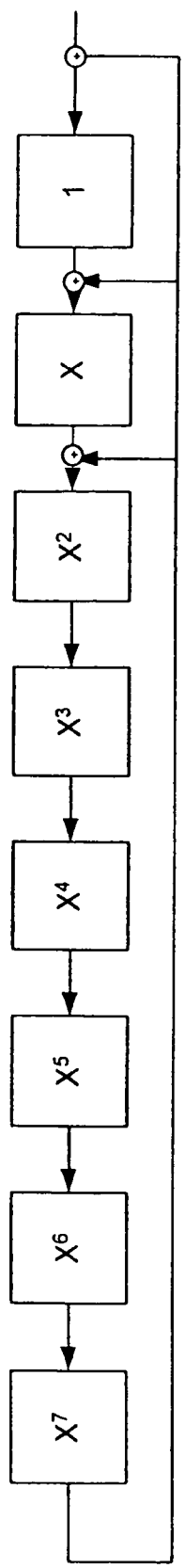
FIG. 10 is a diagram of an exemplary shift register used to calculate a header CRC of the converged data link.

FIG. 10 shows an example of a linear feedback shift register that may be used to calculate the 8-bit CRC in a bit serial fashion. 8, 16, or 32 parallel implementations can be deduced from the bit serial implementation. As is well known by those skilled in the art, a feedback shift register implements long division if coefficients of the dividend are applied at the input on the right. When all the dividend bits have been shifted in, the value stored in the shift register is the remainder. It is to be understood that other methods may be used to calculate 110 the CRC, without departing from the scope of the invention.

Figure 11A:
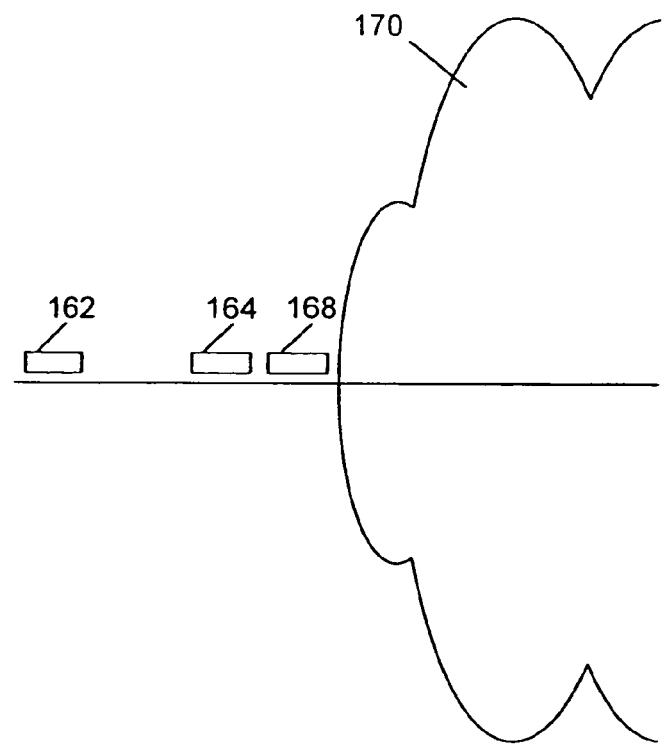
FIG. 11A is a schematic illustrating data packets traveling along a path, each packet containing data.
Figure 11B:
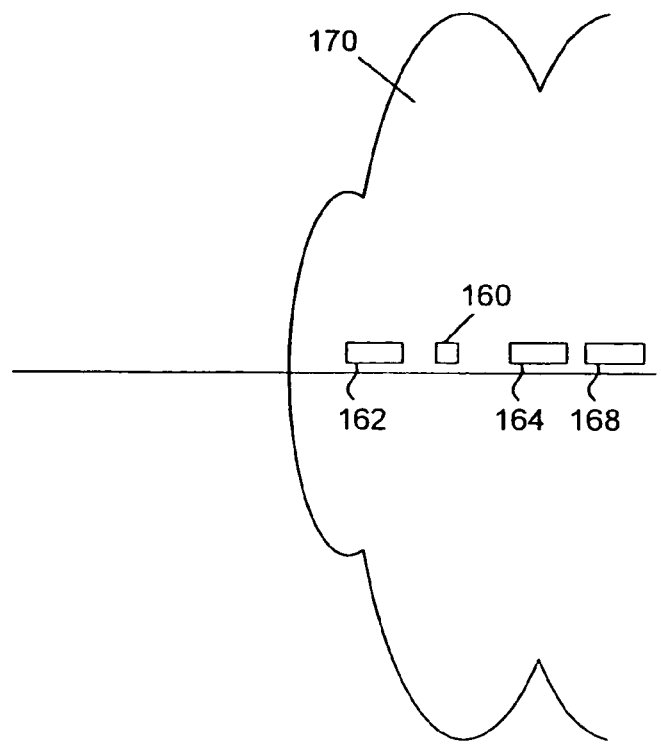
FIG. 11B is a schematic illustrating the path of FIG. 11A with an idle packet inserted between the data packets at a location where no data is being transmitted.

Idle packets may be inserted into a transmit packet stream if the corresponding receive packet stream has long idle intervals, as shown in FIG. 11A. FIG. 11A shows three packets 162, 164, 168 entering an optical network 170. There is a space between packets 162 and 164 representing a location in time when no user data is received. As shown in FIG. 11B, an idle packet 160 is inserted between packets 162 and 164 so that OAM&P information can be transmitted even when there is no user data being transmitted. The idle packet 160 includes the start of field indicator 82, OAM field 98, message channel 100, application specific field 102, and a header CRC 104, as described above and shown in FIG. 6. The idle packet 160, however, does not include the Ethernet packet payload (i.e., data 86 and CRC 88). When idle packet 160 is inserted, the minimum transmit IPG (InterPacket Gap) constraint is preferably observed. Furthermore, when back-to-back idle packets 160 are transmitted, preferably a minimum of (2×Minimum Transmit IPG+Shortest Legal MAC Frame) spacing separates an idle packet from the immediately following idle packet.

Figure 12:
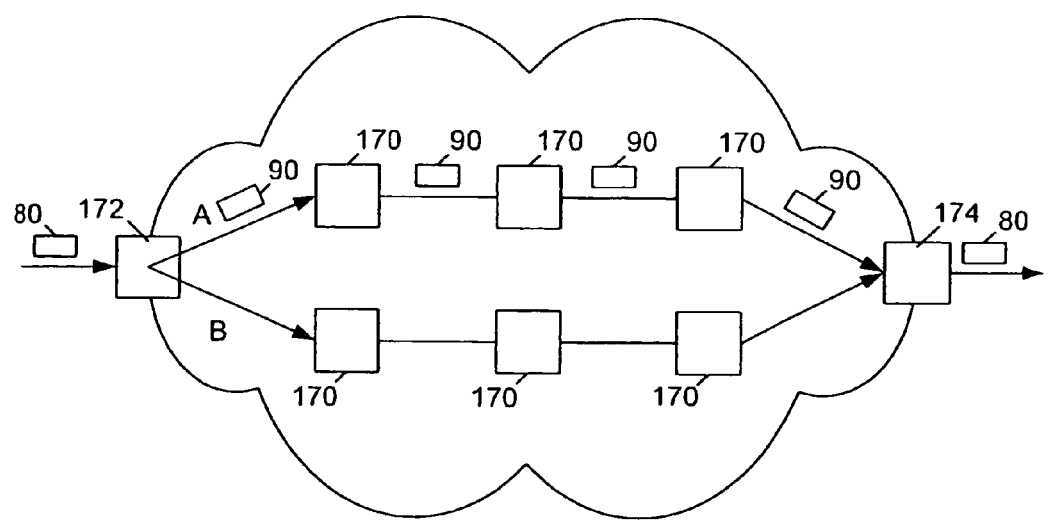
FIG. 12 is a schematic illustrating an optical network with network elements located along an edge of the network for modifying Ethernet packets as the packets enter and exit the network.

FIG. 12 illustrates an optical transport network comprising a plurality of network elements 170 configured to provide two separate optical paths A, B between network elements 172, 174 located along an edge of the optical network. The edge of the network is associated with traffic aggregation or distribution. It is also typically the point of convergence of regional traffic housed in facilities referred to as network points of presence (POPs). As shown in FIG. 12, Ethernet packets 80 are received at network element 172. The Ethernet preamble is stripped from packet 80 at network element 172 and the CDL header is inserted in place of the preamble. The modified packets 90 are provided with two paths to provide redundancy in case of a failure along one of the paths. For example, if a failure is identified on path A, the packets will be transmitted to the network element 174 through path B. Once the packets reach network element 174, the CDL header is removed and replaced with the Ethernet preamble.

Figure 13:
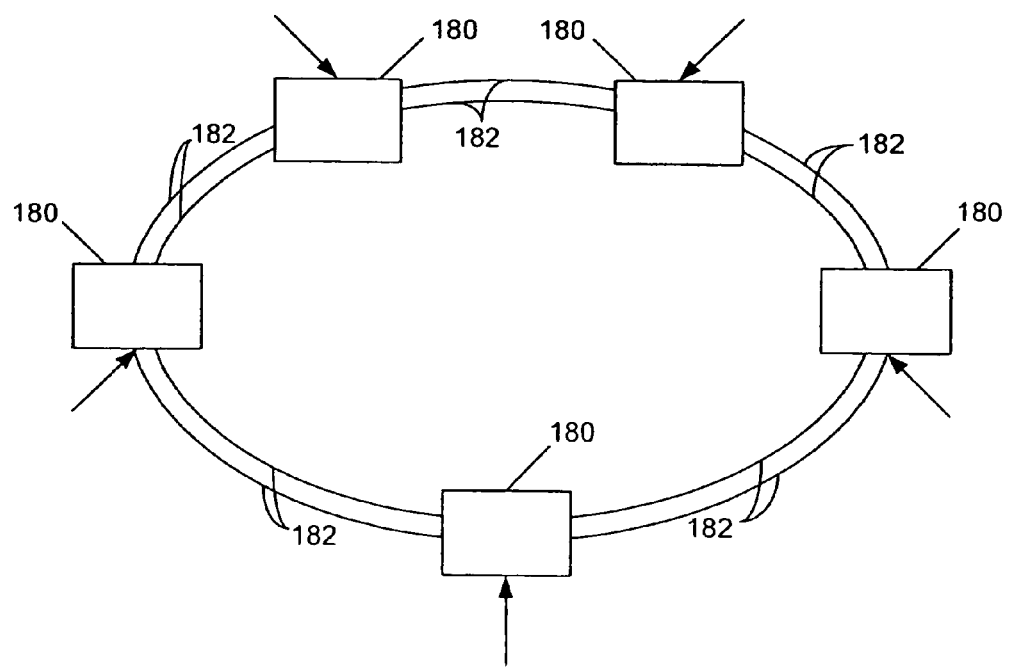
FIG. 13 is a schematic illustrating an optical network with a dual ring topology.
Figure 14:
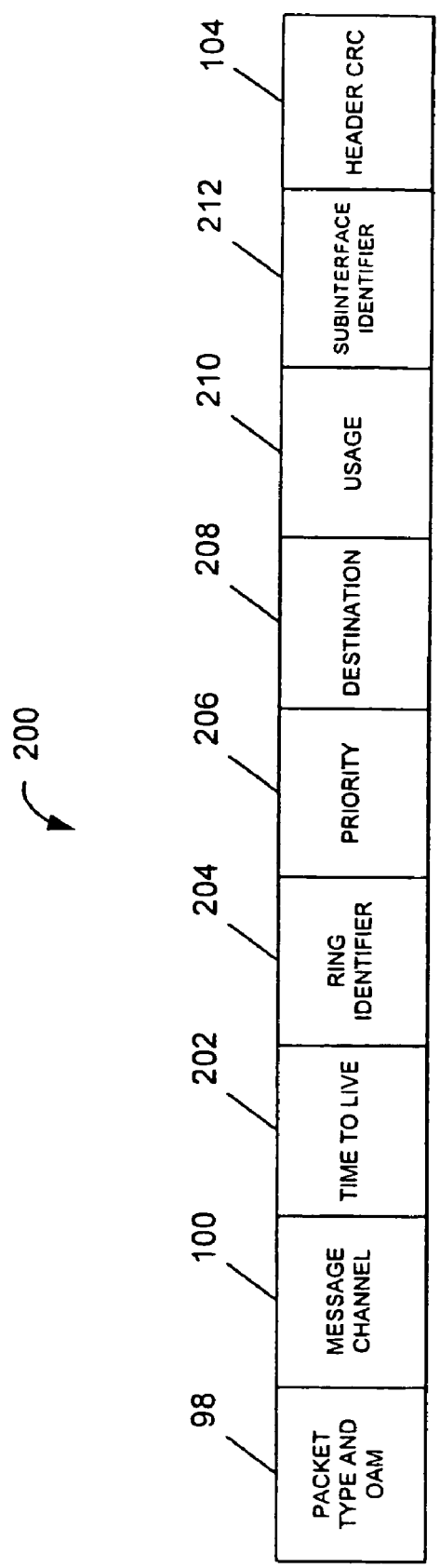
FIG. 14 is a diagram illustrating a CDL header for a network having a dual ring topology.

FIG. 13 illustrates an optical network with a plurality of network elements 180 arranged in a dual ring topology. The ring consists of a collection of ring interfaces connected by point-to-point lines 182. One advantage of the ring topology is its survivability. For example, if a fiber cable is cut, the multiplexers have the local intelligence to send the services affected via an alternate path through the ring without a lengthy interruption. The preamble is stripped from the packet and the CDL header is added as the packet enters any one of the network elements 180 located within the ring. A CDL header 200 for use with a network having a ring topology is shown in FIG. 14. In addition to the OAM field 98, message channel 100, and header CRC 104, the header includes the following fields:

TTL: Time To Live 202
R: Ring Identifier 204
Pri: Priority 206
D: Destination strip 208
Usage: Usage 210
SII: Sub-Interface identifier 212.

These fields correspond generally to the SRP (spatial reuse protocol) for use with ring based media, as described in The Cisco SRP MAC Layer Protocol, dated May 1, 2000, published in the Internet Draft of the Internet Engineering Task Force (IETF).

Figure 15:
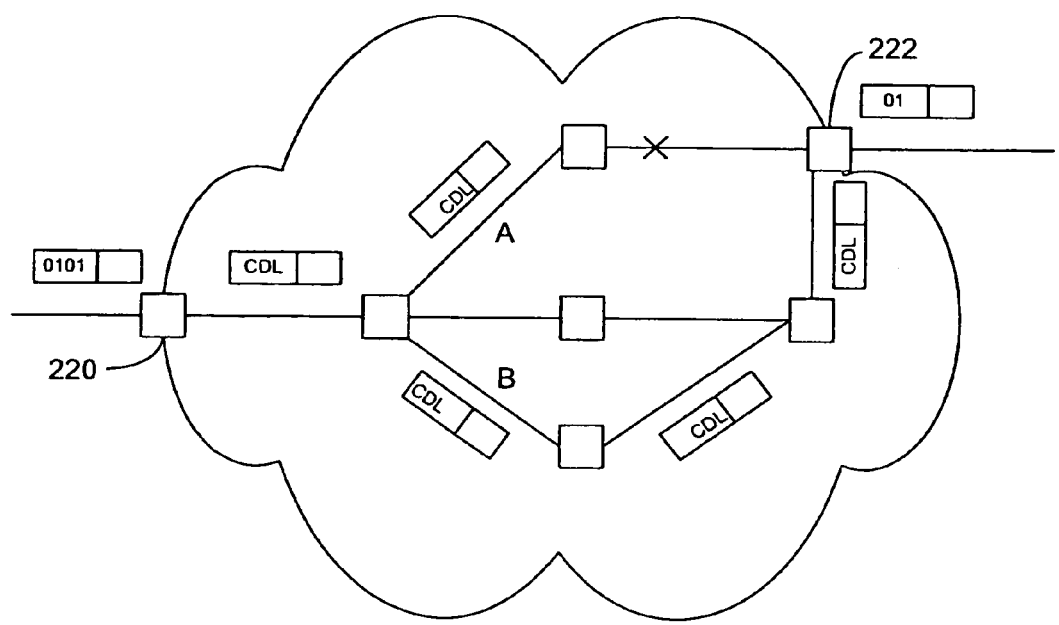
FIG. 15 is a schematic illustrating an optical network with a mesh topology.

A mesh topology network is shown in FIG. 15. As described with respect to FIG. 12, the CDL headers 92 are added and removed at the network edge. The network includes three paths between network elements 220 and 222. A failure was detected along path A (as indicated by an x) and CDL detect indications caused rerouting so the packets were switched to travel along path B to network element 222.

Figure 16A:
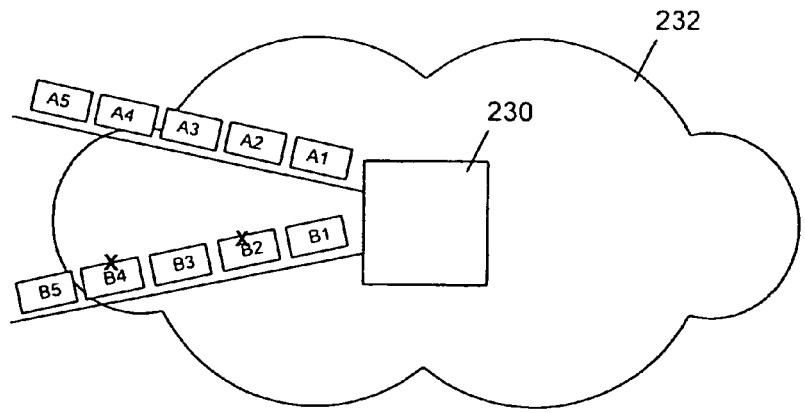
FIG. 16A is a schematic illustrating packets received from a first path and a redundant path at a network element.
Figure 16B:
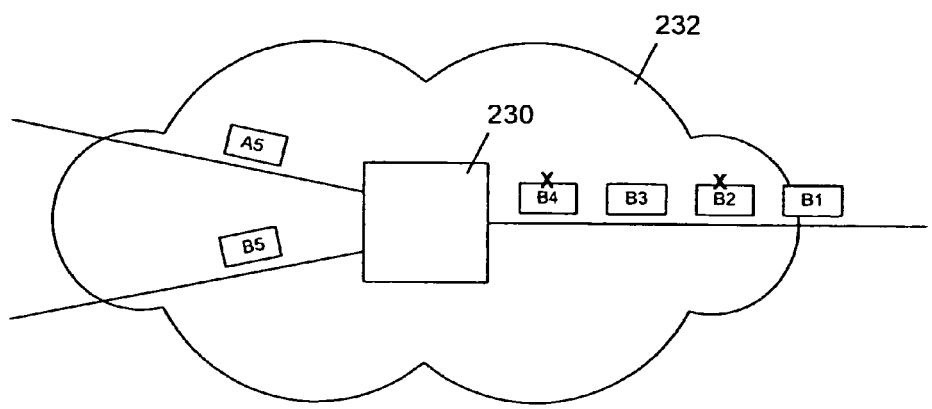
FIG. 16B is a schematic of the network of FIG. 16A illustrating the transmittal of packets from the network element.
Figure 16C:
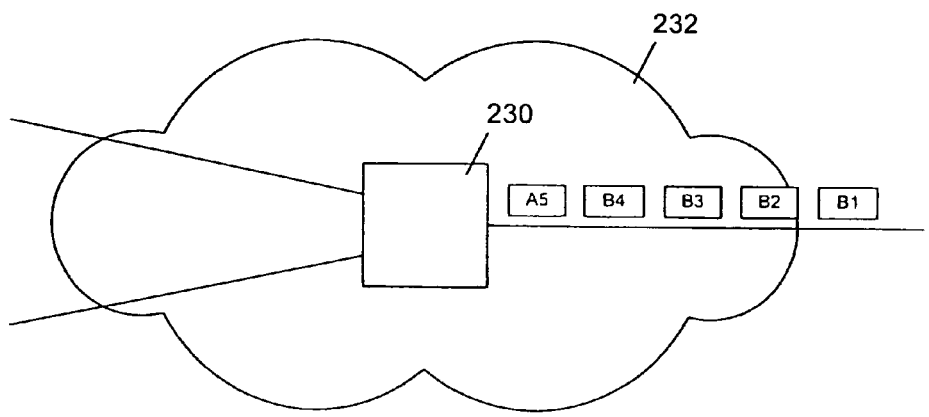
FIG. 16C is a schematic illustrating an error threshold reached at the network element and the element switching to the redundant data path.

FIGS. 16A–16C illustrate a network element 230 located within an optical transport system 232. The network element 230 receives two sets of identical packets from path A and redundant path B. Defect indication provided by the message channel 100 or by end-to-end forward defect indication (FDI-E) allows the receiving node 230 to switch to the redundant channel if a failure threshold is exceeded. FIG. 16B illustrates the transport of packets B1–B4 by the network element 230. During the transmission, an error was detected in packets B2 and B4. The second error presented by packet B4 resulted in the error threshold of network element 230 being reached. After B4 passed through network element 230, the network element switched to the packets received from path A and transmitted packet A5 in place of packet B5, as shown in FIG. 16C. Packets A1–A4 and B5 are discarded by the network element 230.

Figure 17:
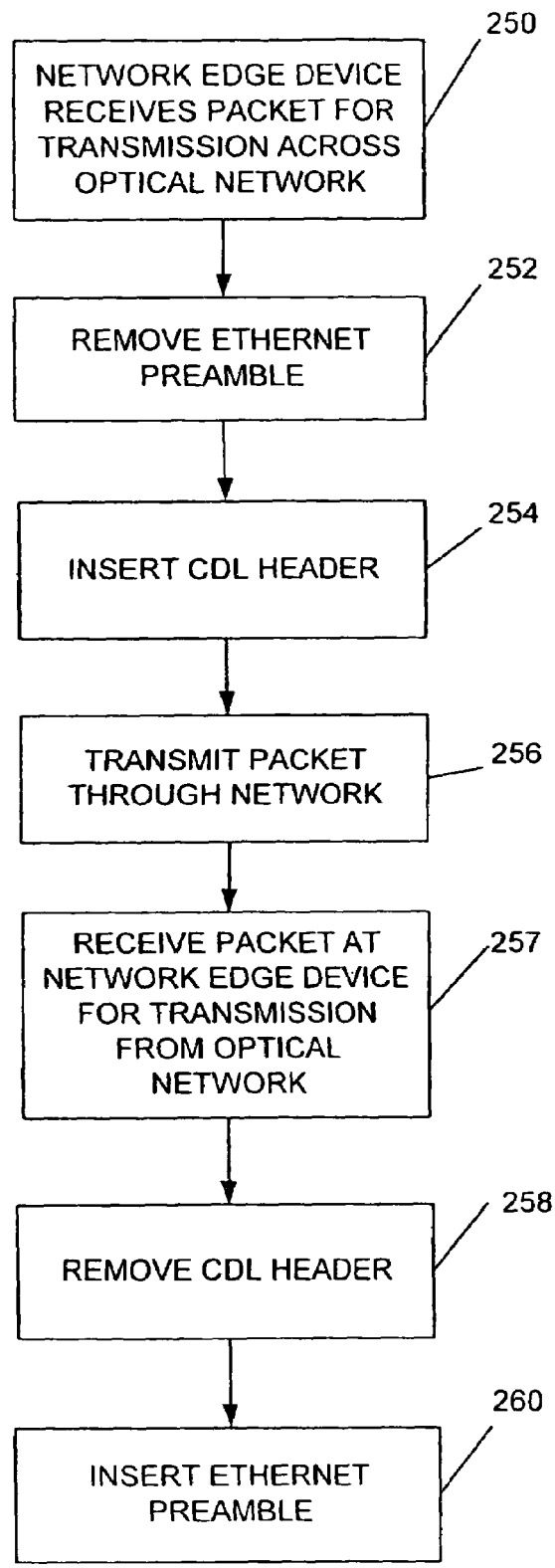
FIG. 17 is a flowchart illustrating a process for receiving Ethernet packets along an edge of an optical network and modifying the packets to add a converged data link header.

FIG. 17 is a flowchart illustrating a process for modifying an Ethernet packet to provide OAM&P capabilities. The Ethernet packet is transmitted to a network element located on an edge of the optical network at step 250. The Ethernet preamble is removed (step 252) and the CDL header is inserted (step 254). The modified packet is then transmitted through the network (step 256). When the packet is received by a network element located at an egress boundary of the network (step 257), the CDL header is removed (step 258) and the Ethernet preamble is replaced (step 260).

As described above, the preferred embodiment of the present invention is implemented in a packet over optics network. However, as one skilled in the relevant art would find apparent, the present invention may be implemented to operate with other carrier technologies. Furthermore, the network may be any type of network appropriate for a given application. For example, the network may be a large public wide area carrier transport system, a private wide area network (WAN), or local area network (LAN).

WAN links may be provisioned as point-to-point circuits over carrier networks with the circuits dropped off from ADMs via CDL interfaces. CDL interfaces for network connectivity include core (i.e., backbone infrastructure for interconnecting distribution or aggregating points in a large network), edge (i.e., data transport between customer premises and points of presence (POPs) and intra-POP connectivity), and metro (i.e., interbuilding connections such as in a small city downtown area or university campus) applications.

As can be observed from the foregoing, CDL introduces no overhead relative to standard Ethernet packets. Furthermore, CDL may support data rates of over 40 Gbps and higher for future network systems. CDL eliminates the SONET/SDH overhead, termination, and equipment, thus providing substantial savings in equipment and operational costs. Moreover, CDL allows integrated network OAM&P in that one connection can reach all network elements within a given architecture and separate links are not required for each network element. Remote provisioning provides centralized maintenance and reduced travel for maintenance personnel. Substantial overhead information is provided in CDL to allow quicker troubleshooting and detection of failures before they degrade to serious levels.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for conveying network management information within a network, the method comprising:
   receiving an Ethernet packet at a network element;
   modifying the Ethernet packet by inserting a header in place of the preamble within the packet while maintaining the format of the Ethernet packet, said header configured to provide support for network management;
   transmitting the modified packet from the network element;
   transmitting a defect indicator within said header; and
   switching a receiving node to a backup path.

2. The method of claim 1 wherein the network element is in communication with an optical network.

3. The method of claim 1 wherein said network management includes operations, administration, and maintenance.

4. The method of claim 3 wherein the header comprises an operations, administration, and maintenance channel and further comprising transmitting operations, administration, and maintenance information from the network element to a network management station.

5. The method of claim 3 wherein the header comprises an operations, administration, and maintenance channel and further comprising transmitting operations, administration, and maintenance information from the network element to other network elements.

6. The method of claim 3 wherein said network management further includes provisioning of paths within the network.

7. The method of claim 3 wherein said network management further includes performance monitoring of paths within the network.

8. A method for conveying network management information within a network, the method comprising:
   receiving an Ethernet packet at a network element;
   modifying the Ethernet packet by inserting a header in place of the preamble within the packet while maintaining the format of the Ethernet packet, said header configured to provide support for network management;
   transmitting the modified packet from the network element; and
   providing an automatic protection switching subchannel within said header.

9. The method of claim 8 wherein said header includes the same number or a fewer number of bytes than the preamble of the Ethernet packet so that the size of the packet is not increased when the preamble is replaced by the header.

10. The method of claim 9 wherein said header comprises 8 bytes.

11. The method of claim 8 wherein said header includes a message channel.

12. The method of claim 11 further comprising using HDLC on the message channel.

13. A method for conveying network management information within a network comprising a plurality of network elements, the method comprising:
   receiving an Ethernet packet at a network element;
   modifying the Ethernet packet by inserting a header in place of the preamble within the packet while maintaining the format of the Ethernet packet, said header configured to provide support for network management;
   transmitting the modified packet from the network element; and
   communicating routing table information among said plurality of network elements via said header.

14. The method of claim 13 wherein said header includes packet type information.

15. The method of claim 14 wherein the packet type information identifies whether the packet is an idle packet or a data packet.

16. The method of claim 14 wherein the packet type information identifies that the Ethernet packet has been modified.

17. The method of claim 13 further comprising providing sideband communication within the network via a sideband channel.

18. The method of claim 17 further comprising IP routing over the sideband channel to enable communication of management data.

19. The method of claim 17 further comprising using the sideband channel to perform topology discovery.

20. The method of claim 13 further comprising multiplexing packet streams at the network element.

21. The method of claim 20 wherein said header comprises a subinterface identifier which identifies an originating port for each of the packets.

22. The method of claim 20 further comprising demultiplexing the packet streams at a receiving node.

23. The method of claim 13 further comprising a network management station and wherein the management station has access to said plurality of network elements via said header.

24. The method of claim 13 wherein the network element is in communication with at least one router.

25. A method for supporting management of a network, the method comprising:
    receiving a modified Ethernet packet at a network element, the modified packet comprising a header configured to provide support for operations, administration, and maintenance;
    replacing the header in the modified packet with a preamble within the packet to create an Ethernet packet; and
    transmitting the Ethernet packet from the network element;
    wherein the header is the same size as the preamble.

26. The method of claim 25 wherein said header includes an error-detecting code word to detect errors in the header.

27. The method of claim 26 wherein said error detecting code is a cyclic redundancy check field.

28. The method of claim 25 wherein the network element is located at an egress boundary of the network.

29. The method of claim 25 wherein receiving a modified Ethernet packet comprises receiving the modified packet from a transit network element located within the network.

30. The method of claim 29 wherein the network element is in communication with an optical network.

31. The method of claim 25 wherein the network is a WAN.

32. The method of claim 25 wherein transmitting the Ethernet packet comprises transmitting the Ethernet packet without a SONET frame.

33. The method of claim 25 wherein transmitting the Ethernet packet comprises transmitting the Ethernet packet without SONET overhead.

34. The method of claim 25 wherein replacing the header comprises maintaining a minimum interpacket gap.

35. The method of claim 25 wherein replacing the header in the modified packet comprises maintaining the format of the Ethernet packet.

36. An Ethernet network system for conveying network management information, the system having a network element comprising:
    a port controller operable to receive an Ethernet packet, modify the Ethernet packet by inserting a header in place of the preamble within the packet while maintaining the format of the Ethernet packet, said header configured to provide support for network management, the port controller comprising an optical to electrical converter and a CDL handler operable to insert the header into the packet; and
    a network element controller coupled to the port controller and operable to generate and consume network management information;
    wherein the header comprises:
        an operations, administration, and maintenance field:
        a message channel;
        an application specific field; and
        a header error detection field.

37. The system of claim 36 further comprising a cross-connect configured to receive the packet from the port controller and select an egress port controller to transmit the packet from the network element.

38. The system of claim 36 further comprising a second network element positioned at an egress boundary of the network, the second network element comprising:
    a port controller operable to receive the modified packet and replace the header with the preamble; and
    a network element controller coupled to the port controller of the second network element and operable to generate and consume network management information.

39. The system of claim 38 wherein the second network element is a downstream network element and further comprising a transit network element operable to receive the modified packet, modify the header, and forward the packet to the second network element.

40. The system of claim 36 wherein the port controller and the network element are configured for receiving and sending Ethernet packets frames.

41. An Ethernet network system for conveying network management information, the system having a network element comprising:
    a port controller operable to receive an Ethernet packet, modify the Ethernet packet by inserting a header in place of the preamble within the packet while maintaining the format of the Ethernet packet, said header configured to provide support for network management and comprising an operations, administration and maintenance field, the port controller comprising a CDL handler and an electrical to optical converter; and
    a network element controller coupled to the port controller and operable to generate and consume network management information.

42. A computer program product for conveying network management information within a network comprising a plurality of network elements, the product comprising:
    code that modifies an Ethernet packet by inserting a header in place of the Ethernet preamble within the packet while maintaining the format of the Ethernet packet, said header providing support for network management;
    code that transmits the modified packet from a network element;
    code that communicates routing table information among said plurality of network elements via said header; and
    a computer-readable storage medium for storing the codes;
    wherein the computer-readable storage medium is not a data signal embodied in a carrier wave.

43. The computer program product of claim 42 further comprising code that removes said header from the modified packet and replaces the preamble.

44. The computer program product of claim 42 further comprising code that provides sideband communication within the network.

45. The computer program product of claim 42 further comprising code that provides each of the packets with a subinterface identifier within said header to allow multiplexing of packet streams.

46. The computer program product of claim 42 wherein code that maintains the format of the Ethernet packet comprises code that maintains an interpacket gap.

47. A system for conveying network management information in an Ethernet system comprising a plurality of network elements, the system comprising:
   means for receiving an Ethernet packet at a network element;
   means for modifying of the Ethernet packet by inserting a header in place of the preamble within the packet while maintaining the format of the Ethernet packet, said header configured to provide support for network management;
   means for transmitting the modified Ethernet packet; and
   means for communicating routing table information among said plurality of network elements via said header.

48. The system of claim 47 wherein means for modifying the packet comprises hardware.

49. The system of claim 47 wherein means for modifying the packet comprises microcode.

50. The system of claim 47 wherein means for modifying the packet comprises software.

51. The system of claim 47 wherein means for modifying the packet comprises photonic logic.

52. The system of claim 47 wherein the network element is located at an ingress boundary of the network.

53. The system of claim 52 wherein said means for modifying the preamble comprises means for replacing an Ethernet preamble with a CDL header.

54. The system of claim 47 wherein the network element is located at an egress boundary of the network.

55. The system of claim 47 wherein said means for modifying the preamble comprises means for replacing a CDL header with an Ethernet preamble.

56. The system of claim 47 wherein the network element is a transit network element.

57. A method for supporting management of a network, the method comprising:
   receiving a modified Ethernet packet at a network element, the modified packet comprising a header configured to provide support for network management;
   replacing the header in the modified packet with a preamble within the packet to create an Ethernet packet;
   transmitting the Ethernet packet from the network element; and
   transmitting back-to-back idle packets and separating the idle packets with a spacing equal to at least two times the minimum transmit interpacket gap.

58. An apparatus for conveying network management information within a network comprising a plurality of network elements, comprising:
   means for receiving an Ethernet packet at a network element;
   means for modifying the Ethernet packet by inserting a header in place of the preamble within the packet while maintaining the format of the Ethernet packet, said header configured to provide support for network management;
   means for transmitting the modified packet from the network element; and
   means for communicating routing table information among said plurality of network elements via said header.

* * * * *